United States Patent

Protze et al.

[11] 3,888,540
[45] June 10, 1975

[54] SAFETY DEVICE

[75] Inventors: Dieter Protze; Andreas Bauer, both of Fallersleben, Germany

[73] Assignee: Volkswagenwerk Aktiengesellschaft, Wolfsburg, Germany

[22] Filed: Oct. 17, 1973

[21] Appl. No.: 407,100

[30] Foreign Application Priority Data
Oct. 31, 1972 Germany............................ 2253265

[52] U.S. Cl.............. 297/384; 280/150 B; 297/117; 297/391; 297/408; 297/417
[51] Int. Cl....................... A62b 35/00; A47c 7/36
[58] Field of Search ............ 297/61, 117, 238, 115, 297/116, 403, 408, 391, 417, 384; 280/150 B

[56] References Cited
UNITED STATES PATENTS

| 276,687 | 1/1883 | Hartley | 297/61 |
| 1,444,024 | 2/1923 | Burdick | 297/115 X |
| 1,717,568 | 6/1929 | Koenigkramer | 297/403 |
| 2,584,481 | 2/1952 | Mast et al. | 297/115 |
| 2,621,708 | 12/1952 | Luce, Jr. | 297/117 |
| 3,008,767 | 11/1961 | Fox | 297/403 |
| 3,186,763 | 1/1965 | Ferrara | 297/403 |
| 3,374,032 | 3/1968 | DelGiudice | 297/394 |
| 3,508,788 | 4/1970 | Barton, Jr. et al. | 297/391 |
| 3,528,703 | 9/1970 | Ohta | 297/301 |
| 3,713,694 | 1/1973 | Miller | 280/150 B |

Primary Examiner—James T. McCall
Attorney, Agent, or Firm—Ernest F. Marmorek

[57] ABSTRACT

A safety device for vehicles of the type having a head rest for three passengers seated next to each other. In order to minimize the impairment of view of the driver the head rest of the middle seat may be swung down together with an arm rest. This will not only increase the passenger's comfort but prevent movement of the body in a lateral direction in case of an accident.

10 Claims, 5 Drawing Figures

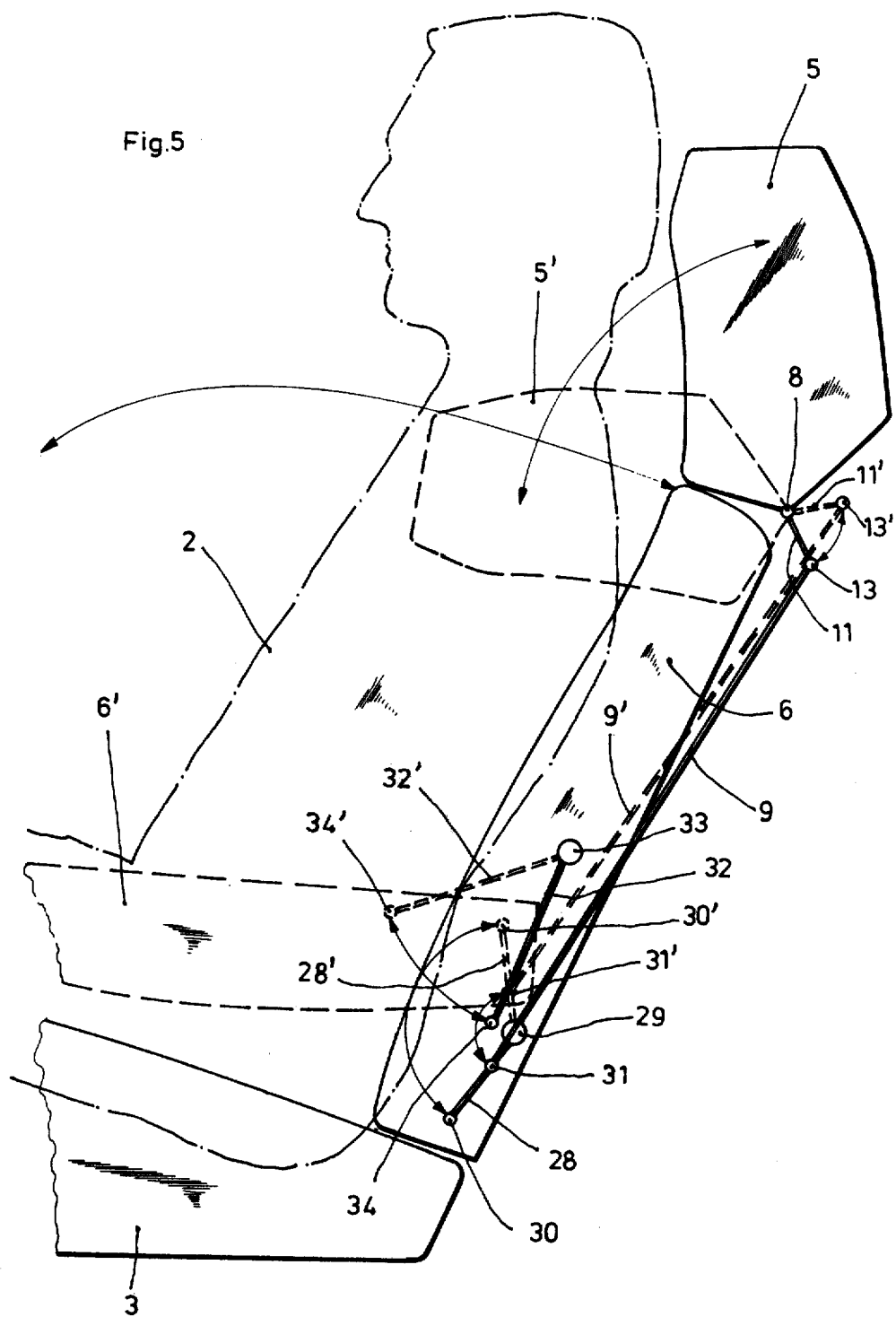

3,888,540

SAFETY DEVICE

BACKGROUND OF THE INVENTION

This invention relates generally to a safety device for vehicles, particularly motor cars of the type having a head support arranged as an extension of the back rest of the passenger seat.

Such head supports are well known and serve essentially the purpose to restrain the head of a passenger during a driving accident. A certain disadvantage of such head supports consists in that they impede the view of the driver above the passenger seat. This is particularly true when three seats for three passengers are disposed in the rear portion of the car, each of which is provided with such a head support. In this case a problem arises particularly with the intermediate one of the three seats.

It is accordingly an object of the present invention in case of a vehicle having seats for three passengers in the rear part of the car that when one of the seats is not used the head support associated with the unused seat does not impede the driver's free view above the rear part of this seat.

A further object of the present invention is to provide in a vehicle of the type described additional means for lowering the head support and simultaneously lowering an arm rest which helps to maintain the passenger in his seat in case of a driving accident.

SUMMARY OF THE INVENTION

In accordance with the present invention the head support is adjustable away from its position which impedes the driver's free view, that is from its head restraining position. Preferably, the head support is rotatable about a horizontal transverse axis extending approximately through the upper edge of the back rest.

Accordingly, it is possible that a head support disposed above the back rest of a passenger seat can be tilted from its head restraining position as long as the seat is unused. This in turn means that the field of view of the driver is substantially increased wherever the head support is not used.

In accordance with the preferred embodiment of the invention and for a vehicle having at least three adjacent passenger seats, particularly for a three-passenger seating rear portion of an automobile, the head rest of the intermediate seat is adjustable from its head restraining position toward the passenger seat. This guarantees that at least the head support of the intermediate passenger seat which particularly decreases the rear field of view of the driver, may be removed from the field of view when only four persons ride in the vehicle. While it is necessary to tolerate the limitation of the rear field of view of the driver by the three heads of the passengers which extend into the driver's field of view when the vehicle is filled with five passengers, a substantial increase of the rear field of view may be achieved when only four passengers are in the car by rotating the head support in the direction toward the passenger seat, for example, by rotating it about a horizontal transverse axis.

According to a further feature of the invention the rotatable head support may be utilized in a particularly advantageous manner for increasing the safety of passengers in the vehicle. This is accomplished in that the head support is rotated into a second position disposed about at the height of the shoulder of a passenger for laterally restraining the shoulder of a passenger seated in the adjacent seat.

A particularly advantageous construction is obtained when an arm rest is provided which is countersunk in the back rest of the intermediate passenger seat. This arm rest can be tilted out by a passenger when the seat is not used and which may have the same width as the head support. The head support may then be tilted into the space freed when the rest is moved into its arm supporting position. A further feature of the invention consists in interconnecting the arm rest and the head support by an actuating element in such a manner that when the arm rest is pulled out by a passenger the head support is simultaneously rotated downwardly. This may be effected by a connecting rod which is journalled at one end to the arm rest and at the other end to the head support. In order to avoid a mutual interference when arm rest and head support are simultaneously rotated, the simultaneous rotation of arm rest and heat support from the starting position is to take place in such a manner that during the beginning of the rotational motion large rotational angles of the arm rest are correlated with small rotational angles of the head support. Such a motion may simply be obtained by disposing the junction point of the interconnecting rod to the arm rest in the initial position essentially vertically below the rotational axis of the arm rest.

In order that the head support can be used not only for restraining the head of a passenger, but also in its rotated position for laterally restraining the shoulder of the passenger, it is further proposed that the head rest is provided with a frame which is formed to absorb energy and to yieldably absorb forces not only in the longitudinal direction of the vehicle but also in the transverse direction. Furthermore, also the arm rest should be provided with a frame which is capable of absorbing forces or energy extending in the transverse direction of the vehicle. In this manner the arm rest may be utilized for safety purposes, that is for the lateral restraint of the pelvis region of the passengers in the neighboring seats.

In accordance with the invention, particularly for an automobile having three rear seats for passengers, there is achieved in case not all seats are used, not only an increase of the field of view of the driver in the rearward direction, but at the same time an increase of safety with relatively simple means. It consists in an effective combination of known elements such as the head support and a tiltable arm rest which are combined to a functional unity which fulfills the requirements for the utilization of three rear seats and additionally increases the safety of the passengers.

The novel features that are considered characteristic of this invention are set forth with particularity in the appended claims. The invention itself, however, both as to its organization and method of operation, as well as additional abjects and advantages thereof, will best be understood from the following description when read in connection with the accompanying drawings.

BRIEF DESCRIPTION OF THE DRAWINGS

FIG. 5 is a longitudinal sectional view, similar to that of FIG. 1, of a modified connection between the head support and arm rest.

DESCRIPTION OF THE PREFERRED EMBODIMENTS

Figure 1:
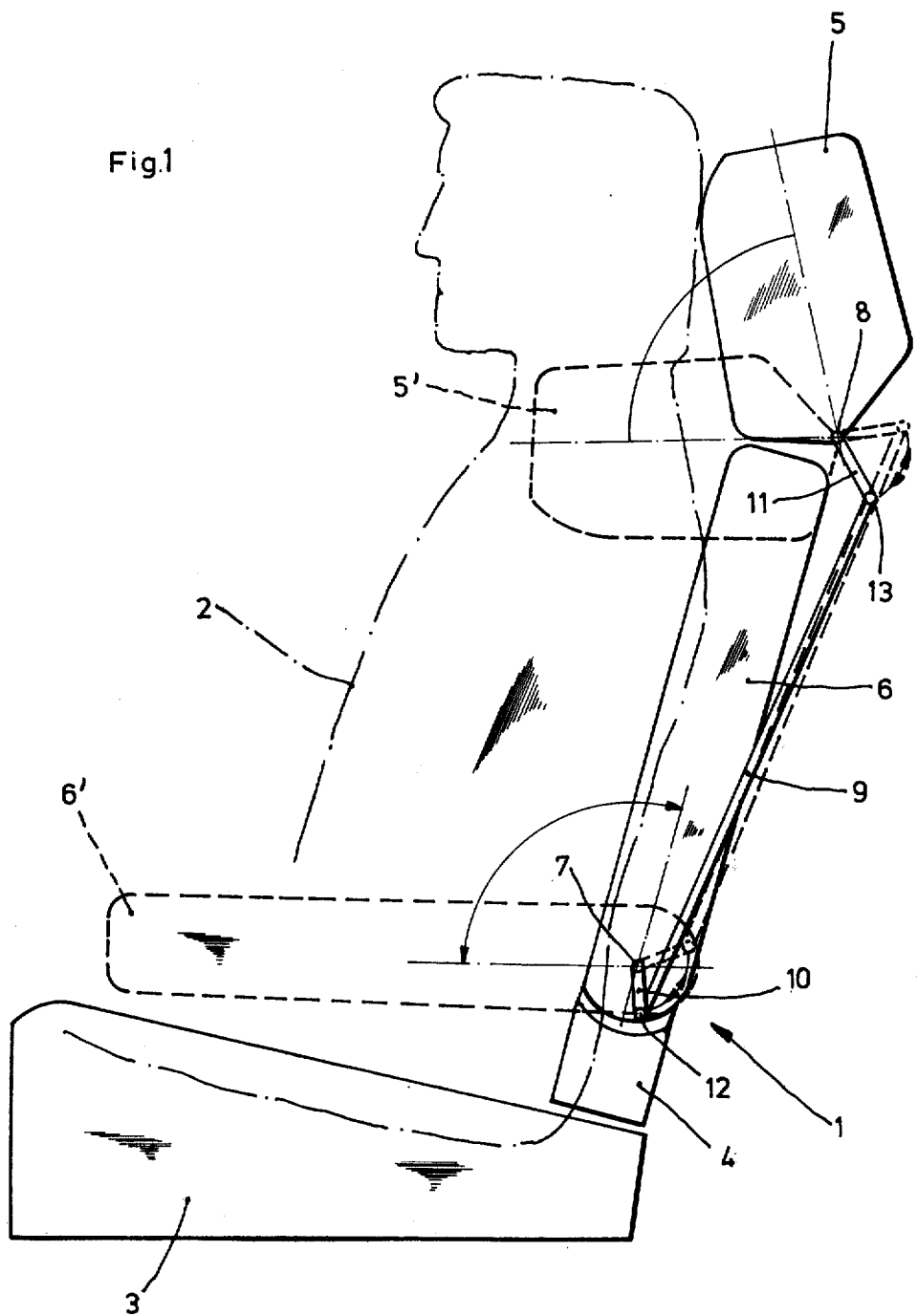
FIG. 1 is a longitudinal sectional view through the intermediate passenger seat of a three-passenger compartment and having a rotatable arm rest and a head support.

Referring now to FIG. 1, there is illustrated the intermediate seat 1 of a three-passenger compartment in the rear portion of an automobile. The seat 1 includes an upholstered seating surface 3 and also an upholstered back rest 4 with an arm rest 6 disposed countersunk in the rear seat and which may be rotated downwardly. The extension of the back rest is formed by a head support 5. A passenger is indicated in dashed out lines at 2 who is seated in the seat 1. When the intermediate passenger seat is not used the tiltable arm rest 6 may be rotated by a passenger as is well known about a rotational axis 7 into the position 6' shown in dotted lines. According to the invention the head support 5 in this case, that is when the seat is not used, can also be rotated into a position, shown at 5' in dotted lines. To this end the head support 5 has a transverse axis 8 extending in a horizontal direction at the upper edge of the back rest 4. In order to interconnect the rotational movement of the arm rest 6 and of the head support 5 there is provided an interconnecting rod 9, the lower end of which is journalled at a point 12 to the rotatable arm rest 6. Accordingly, the point 12 forms a swinging lever 10 with respect to the rotation axis 7. The upper end of this interconnecting rod 9 is journalled at a point 13 to the swinging arm 11 of the head support 5. By means of dotted lines the rotated positions of the connecting rod 9 and the swinging arms 10 and 11 is shown.

The arm rest 6 extends to the upper edge of the back seat 4 so that if the arm rest 6 and head support 5 have equal width the head support may be rotated into the space freed by rotating the arm rest out of its vertical position.

In order that the rotational movement of arm rest 6 and head support 5 which are interconnected by the connecting rod 9 do not interfere with each other at the beginning of the rotational movement, the arm rest 6 is to be rapidly moved out of its starting position where it was sunk in the back seat without essentially rotating the head support 5. This is achieved in that the journal point 12 of the connecting rod 9 to the arm rest 6 is disposed in the starting position of the arm rest about vertically below the rotational axis 7 of the arm rest. The swinging arm 10 should accordingly assume in the starting position an essentially vertical position. For such an arrangement of the point of attack of the connecting rod 9 to the arm rest 6, the interconnecting rod 9 is essentially only moved a small amount in a vertical direction even though the arm rest rotates through a relatively large angle. Accordingly, the swinging arm 11 at the head support 5 also rotates only through a small angle.

In the rotated position 5' the head support is disposed about approximately at the height of the shoulder of a passenger. Accordingly, the head rest may be utilized in this position for laterally supporting and restraining the passenger in the adjacent seat. Also, the tiltable arm rest 6 serves in its rotated position 6' not only for resting the arms of the passengers but also serves the safety needs of the passengers. Accordingly, it supports and restrains the pelvis of the passengers in the adjacent seat.

Figure 2:
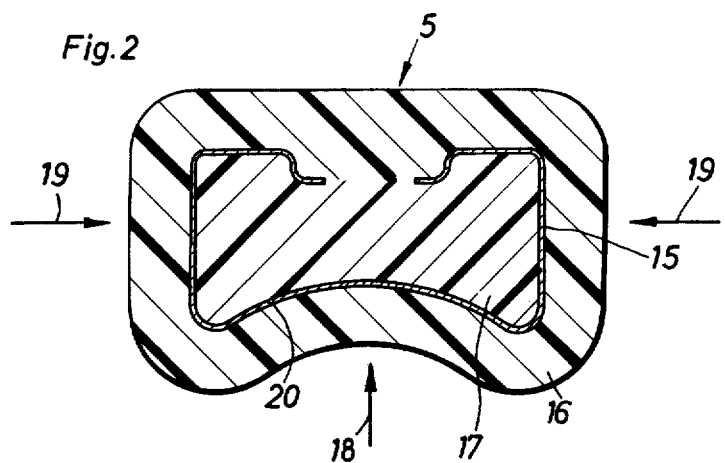
FIG. 2 is a horizontal sectional view through the head support in its head restraining position.
Figure 3:
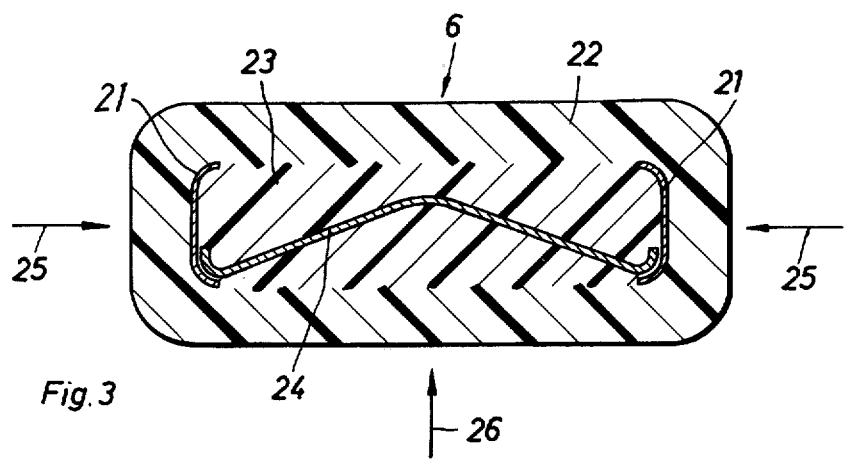
FIG. 3 is a cross-sectional view through the arm rest.

FIGS. 2 and 3 show examples for a construction of these safety elements. According to the invention they are made to yieldably absorb lateral forces such as is required to restrain passengers during a lateral impact on the vehicle.

FIG. 2 illustrates schematically a cross-section through the head support 5 which is provided with a frame 15 in its interior. The frame may be upholstered with a comfort layer 16 and the interior may, for example, be provided with a hard foam core 17. The face of the frame 15 turned toward the head of the passenger is disposed dish-shaped as shown at 20 while the lateral surfaces are essentially plane. The frame may, for example, consist of sheet metal and may be provided in a known manner with cutouts and free cuts such as at the corners.

Figure 4:
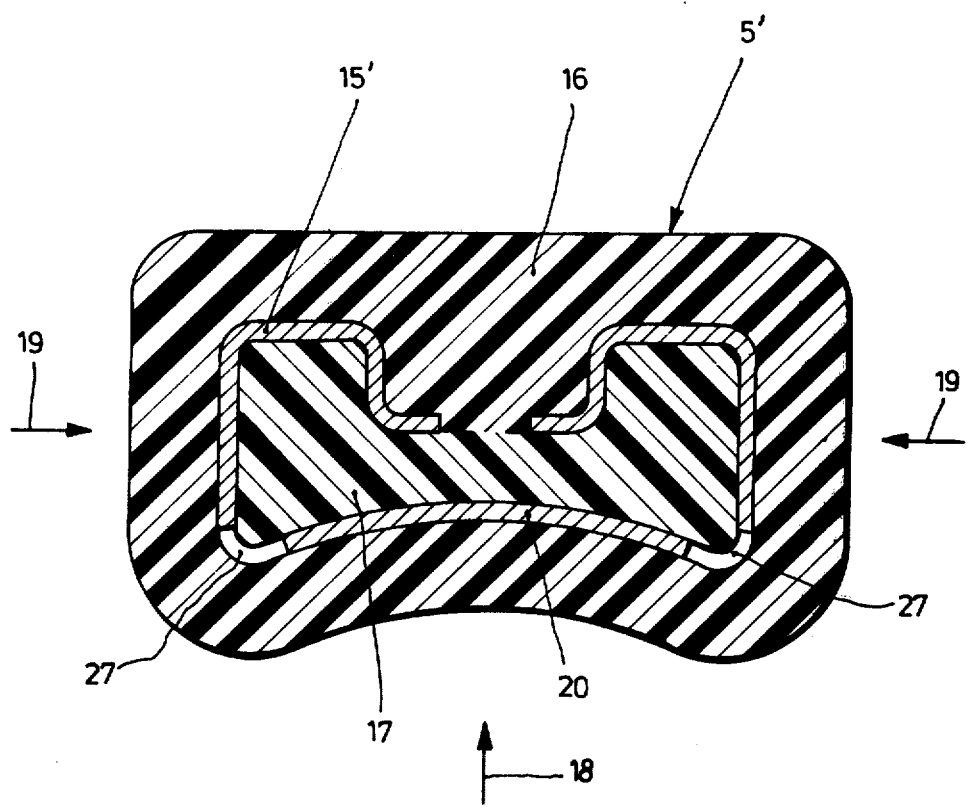
FIG. 4 is a horizontal sectional view, similar to that of FIG. 2, through a modified head support embodying the invention.

Such a modification of the head support of the invention is illustrated in FIG. 4 which is a cross-section similar to that of FIG. 2. In the embodiment of FIG. 4, the frame 15' is provided with cutouts 27 at the front corners, that is, the corners facing the head of the passenger. These contribute to a uniformly as possible deformation path when the head support is loaded. Just at the corners of the frame bent from a piece of sheet metal, these areas have increased strength compared to other areas and thereby provide an increased deformation resistance. This deformation resistance is decreased by the free cuts illustrated in FIG. 4. This will result in an almost uniform deformation path in case the forces extend in the direction of arrow 18 through the head of a passenger as well as in the direction of arrows 19 through the shoulders of passengers in neighboring seats.

FIG. 3 illustrates a cross-section through the tiltable arm rest 6. The arm rest 6 may be provided at the lateral surfaces with a sheet metal frame 21 which may, for example, extend circumferentially within an outer comfort layer 21 while a hard foam core 23 is disposed in the interior. The arm rest in its starting position where it is sunk in the back rest only suffers relatively small forces in the direction of arrow 26 in view of the larger surface of the entire back rest. The frame 21 nevertheless must yieldably absorb energy forces which arise during the lateral restraint of the pelvis region of the neighboring passengers which are indicated by the arrows 25. To this end a lateral frame 24 which may, for example, be pre-bent may be provided. The lateral frame 24 in connection with the hard foam core 23 and the circumferentially extending frame 21, can yield a large deformation work coupled with a uniform deformation path without producing great peak loads.

It will be understood that the construction of the head support 5 and the arm rest 6 for the yieldable absorption of energy and for the restraining forces may also be selected in a different manner. It is also within the spirit of the invention to provide not only the intermediate seat of the rear compartment of a vehicle but also other seats with the exception of the driver's seat with rotational or counter sinkable head rests in order to provide better rear view for the driver and increased safety.

Finally, instead of a simple lever 10 and an operating connection between the arm rest 6 and the head support 5, a correspondingly formed hinge having many rotation points such, for example, as a double joint hinge may be provided. This would guarantee an exact, simultaneous but unequal rotation of head support and arm rest combined with an optimum use of the available space. Such a hinge is illustrated in FIG. 4 which is a longitudinal sectional view similar to that of FIG. 1. This construction shows a hinge having a plurality of rotation points. In order to swing the arm rest there is provided a double hinge or scissor hinge consisting of two swinging levers 28 and 32. The swinging lever 28 is journalled to the connecting rod 9 for connecting the arm rest 6 with the head support 5. This journalled connection of the connecting rod 9 to the first swinging lever 28 takes place at a point 31 while 29 indicates the point of rotation disposed at the vehicle chassis for the tilting lever 28; 30 indicates the point of connection between the swinging lever 28 to the arm rest 6. The point of rotation of the swinging lever 32 disposed at the vehicle chassis is arranged at 33 while 34 depicts the point of attack of the swinging lever 32 at the arm rest 6. Full lines indicate the position of the arm rest and the head support in the upper or operative position, while broken lines indicate the position of these elements when they are swung down. This swung down position is indicated by privied reference numbers. The advantage of this arrangement which is somewhat more complicated consists in a better and more exact guidance of the arm rest. Particularly, this arrangement does not require a special switching space extending beyond the back rest while the arm rest is swung down.

What is claimed is:

1. A safety device for an automotive vehicle having first and second passenger seats disposed along side each other, said second seat being provided with a head support extending above its back rest, said safety device comprising moving means for moving said head support from its head restraining position into a second position approximately at the height of the shoulder of a seated average adult passenger for laterally restraining the shoulder of said passenger seated in said first seat.

2. The safety device as claimed in claim 1, wherein said vehicle further comprises a third passenger seat disposed along side said second seat, said heat support being disposed to provide lateral restraining for the shoulder of another passenger in said third seat.

3. The safety device as defined in claim 2, wherein an arm rest is provided which is normally disposed sunk in the back rest of said second passenger seat, said arm rest being tiltable away from the back rest and having approximately the same width as said head support, said head support being movable into the space previously occupied by said tilted arm rest.

4. The safety device as claimed in claim 3, further comprising connecting means for connecting said arm rest and said head support to each other and operable to cause a simultaneous and joint swinging movement.

5. The safety device as claimed in claim 4, wherein said connecting means comprises a connecting rod having one end journalled to said arm rest and having its other end journalled to said head support.

6. The safety device as defined in claim 4, wherein the simultaneous swinging rotationary motion of said arm rest and said head support from their starting positions takes place in such a manner that at the beginning of the swinging motion large swinging angles of said arm rest are coordinated with small swinging angles of said head support.

7. The safety device as defined in claim 6, wherein the point of attack of said connecting rod to said arm rest in the initial position is substantially disposed vertically below the swinging axis of said arm rest.

8. The safety device as defined in claim 2, wherein said head support is provided with a frame which is arranged to absorb energy both in the longitudinal direction and in the transverse direction of the vehicle.

9. The safety device as defined in claim 3, wherein said arm rest is provided with a frame which is arranged for absorbing energy in a direction transverse to the vehicle.

10. The safety device as defined in claim 4, wherein said head support and said arm rest are interconnected by a hinge having at least two joints for the simultaneous rotation thereof.

* * * * *